United States Patent

[11] 3,572,798

[72] Inventor Alex Kunevicius
  Independence, Ohio
[21] Appl. No. 772,125
[22] Filed Oct. 31, 1968
[45] Patented Mar. 30, 1971
[73] Assignee Custom Trim Products, Inc.
  Cleveland, Ohio
  Original application Dec. 13, 1966, Ser. No. 601,473, now Patent No. 3,439,950, dated Apr. 22, 1969, which is a continuation-in-part of application Ser. No. 477,273, Aug. 4, 1965, now abandoned.

[54] RESILIENT BUMPER STRIP
  2 Claims, 6 Drawing Figs.
[52] U.S. Cl. .................................................. 293/1,
  49/493, 52/716, 116/28, 161/161, 161/178,
  248/345.1, 267/140, 280/150, 293/62, 293/71
[51] Int. Cl. ...................................................... B60j 19/00,
  B60r 5/04, B61f 19/04
[50] Field of Search........................................... 49/488;
  52/717, 718; 152/330; 161/39, 88, 160, 133,
  (ABS); 267/1 (R), 1 (FB); 280/152; 301/5, 5 (B),
  51, 51 (B); 293/54D; 49/493; 52/716; 116/28;
  161/161, 178; 248/345.1; 267/140; 280/150;
  293/1, 62, 71

[56] References Cited
UNITED STATES PATENTS

| | | | |
|---|---|---|---|
| 1,912,255 | 5/1933 | Clark............................ | 49/493 |
| 1,979,691 | 11/1934 | Jackson........................ | 161/178 |
| 2,057,873 | 10/1936 | Atwood........................ | 161/88 |
| 2,161,837 | 6/1939 | Teil.............................. | 280/150 |
| 2,239,422 | 4/1941 | Hayashi........................ | 116/28 |
| 2,292,024 | 8/1942 | Dreher......................... | 161/160 |
| 2,303,864 | 12/1942 | Reasor........................ | 52/717 |
| 2,734,765 | 2/1956 | Henderson et al............ | 293/62 |
| 2,739,358 | 3/1956 | Kunkel........................ | 49/488 |
| 3,147,176 | 9/1964 | Haslam........................ | 161/39 |
| 3,173,826 | 3/1965 | Campbell et al.............. | 161/161 |

OTHER REFERENCES
  Whitney, J. L.; ABS Resins; September 1963 1, 144, 145, 146, 147, and 148; Modern Plastics Encyclopedia; Issue for 1964; Volume 41 Number 1A

*Primary Examiner*—Arthur L. LaPoint
*Assistant Examiner*—Howard Beltran
*Attorney*—Bosworth, Sessions, Herrstrom and Cain ABSTRACT: A protective decorative, and resilient buffer accessory molding for and in combination with motor vehicles and the like and a method for making the same.

PATENTED MAR 30 1971
3,572,798
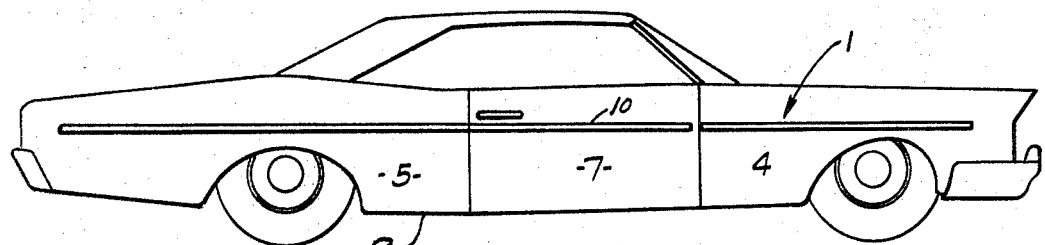
Fig. 1
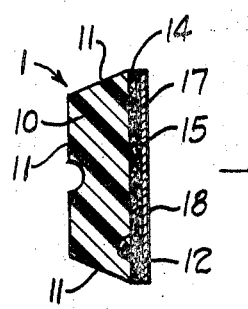
Fig. 2
Fig. 3
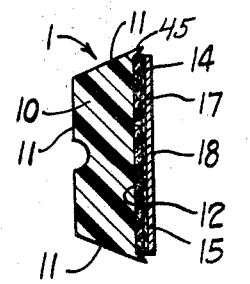
Fig. 6
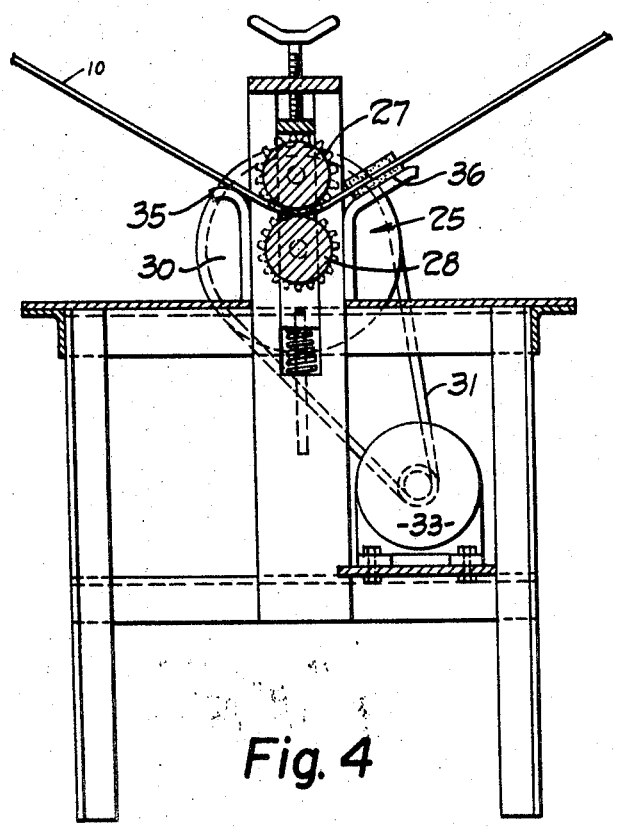
Fig. 4
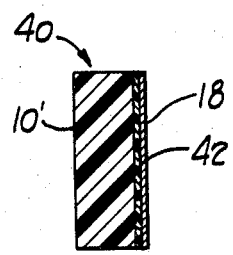
Fig. 5
INVENTOR.
ALEX KUNEVICIUS
BY Bosworth, Sessions,
Herrstrom + Cain
ATTORNEYS.

3,572,798

RESILIENT BUMPER STRIP

CROSS-REFERENCE TO RELATED APPLICATION

This application is a division of applicant's copending application, Ser. No. 601,473, filed Dec. 13, 1966, now U.S. Pat. No. 3,439,950 which, in turn, was a continuation-in-part of applicant's then copending application, Ser. No. 477,273, filed Aug. 4, 1965, now abandoned.

BACKGROUND OF THE INVENTION

1. Field of the Invention

This invention relates to means for protecting and decorating motor vehicles and the like and to a process for making said means.

2. Description of the Prior Art

A problem has long existed because of damage caused to the paint or finish, as by scratching or chipping, of vehicles, such as automobiles and the like, especially when struck by the door of an adjacent vehicle when that door is opened or to the door, and particularly the edge thereof, of the vehicles themselves should the door swing open against an adjacent vehicle, wall, post or the like, as in parking lots, parking garages, and similar locations where vehicles are parked and crowded closely together.

Even small nicks, scratches and chips are costly and expensive to repair and the problem of perfectly blending the patch into the rest of the vehicle surface is great. Yet for the average owner, as well as the person who takes pride in his automobile, the unsightliness of the damage to the finish due to such nicking, scratching and chipping and the loss of value to the vehicle as a consequence thereof is such that repairs to the finish cannot prudently be left undone, especially when relatively new or expensive vehicles are involved.

The problem has become aggravated in recent years because of the introduction of motor vehicles having sculptured, but plain, side lines which provide raised lines or surfaces extending longitudinally along the vehicle body, since such lines or surfaces not only often receive the initial impact from a door, or the like, of an adjacent vehicle opening against the side of the vehicle having them, but also, because of modern manufacturing practices which in some instances dictate that the vehicle be made and sold without metal trim, and the like, which would otherwise offer some protection to a vehicle, albeit such trim, itself, often damages an adjacent vehicle if a door upon which it is mounted swings thereagainst.

Further while protective moldings of various types and structure have been proposed in the past, they have not proven successful either because they were designed for only temporary adherence to the vehicle while the same was parked and removal therefrom during driving, which meant that the molding was easily removed and stolen, or because they were of complicated and/or expensive structure or were not decorative; or because they were difficult to install and use or did not adhere to the vehicle with sufficient permanence, either because of their structure or because of vibration of the vehicle during use and operation.

SUMMARY OF INVENTION

The invention comprises and has the general object of providing a new and improved protective and decorative accessory molding for motor vehicles, such as automobiles, and the like.

Other objects of this invention include the provision of a new and improved protective and decorative accessory molding for motor vehicles, such as automobiles and the like, which is economically manufactured, installed and used; which is useful over a wide range of temperatures such as encountered outside over an annual cycle; which is shock resistant at low temperatures; which is easily used and applied even by unskilled help; which may have any desired surface configuration to add to the decorative effect thereof; which may be of any desired color; and, which will retain its color even under adverse weathering conditions, such as snow, precipitation, heat and sunlight.

Still other objects of this invention include the provision of a new and improved protective and decorative molding accessory for motor vehicles, such as automobiles and the like, which has improved adherence to the surface of the vehicle body; which resists lifting and separating at its ends from the surface of the vehicle body; which has structure urging its ends into a contact with the surface of the vehicle body; which is prestressed or deformed longitudinally and curved or bowed inwardly toward the side to be adhered to the vehicle; which is prestressed or deformed longitudinally and curved or bowed inwardly substantially uniformly throughout its length so that an entire molding and any part or portion thereof, or part or portion of a said part or portion, is similarly prestressed and deformed and curved; which has a plurality of layers including a body portion and a soft vibration-absorbing portion for disposition adjacent the vehicle body when the molding is mounted thereon; and, which has a plurality of separate layers adhered together to form a unitary molding with a resilient, blow-absorbing body portion and a softer vibration-absorbing portion intermediate said body portion and the vehicle when the molding is mounted thereon.

A further object of this invention includes a new and improved process for making protective and decorative accessory moldings for motor vehicles, such as automobiles and the like.

A still further object of this invention is to provide a new and improved protective and decorative molding, and method of making the same, for motor vehicles, such as automobiles and the like, which obtains one or more of the objects and advantages set forth above.

These and other objects and advantages of this invention will become apparent from the following description of preferred and modified forms thereof.

The invention comprises a protective and decorative accessory molding for the doors and side panels of motor vehicles such as automobiles and the like, and other surfaces, having a protective and decorative, elongated, flexible and resilient body member with an outer or exposed surface of predetermined configuration and color to provide a decorative appearance and an inner surface, a pressure sensitive adhesive on said inner surface for adhering and substantially permanently securing said molding to the surface to be decorated and protected, and a flexible covering detachably adhered to said pressure sensitive adhesive; such a molding in which the body member retains its adherence, flexibility, resilience and appearance over a wide range of temperatures in summer and in winter and under all types of weathering conditions and in which the body member is shock resistant at low temperatures; such a molding in which the body member is prestressed or deformed and curved or bowed inwardly longitudinally and is so prestressed or deformed and curved or bowed substantially equally throughout its length so that each part and portion thereof, and each part portion of each part and portion, is similarly prestressed and deformed and curved and bowed; such a molding with a soft vibration-absorbing layer of substantial thickness disposed between said inner surface and said pressure sensitive adhesive; and such a molding, or a said modification thereof, in combination with a motor vehicle and the like, as well as a new and improved process for making a protective and decorative accessory molding for motor vehicles, such as automobiles and the like.

BRIEF DESCRIPTION OF THE DRAWINGS

FIG. 1 is a view of a protective and decorative molding accessory embodying a preferred form of this invention in use on an automobile;

FIG. 2 is a vertical section, on an enlarged scale, of the molding of FIG. 1, before mounting on the automobile;

FIG. 3 is a side elevation of a section of the molding of FIG. 2 on a reduced scale;

FIG. 4 is a partly schematic, vertical section of one form of apparatus for practicing the method of this invention;

FIG. 5 is a vertical section of a modified form of molding embodying this invention; and FIG. 6 is a vertical section of a modified form of the molding shown in FIGS. 1 and 2.

DESCRIPTION OF THE PREFERRED EMBODIMENTS

A molding embodying a preferred form of this invention is indicated generally at 1, FIGS. 1, 2 and 3. Molding 1 is shown, FIG. 1, mounted and in use upon a motor vehicle 2. Motor vehicle 2 may take any desired form, but usually includes front and rear side panel sections, 4 and 5, respectively, and a door 7. Molding 1 is positioned on the vehicle with respect to the side panels of the body and the door thereof in particular, so as, on the one hand, to receive and cushion blows and impacts which otherwise might be delivered against the surface of the vehicle by doors and other objects, as, for example, when the door of an adjacent vehicle is opened in a parking lot, parking garage and similar locations, and, on the other hand, to provide a protective and decorative cushion on the door of the vehicle so that when the door is swung open it will be protected from damage by and will protect any other surface, such as a wall, post or other vehicle, against which it might strike.

Molding 1 is shown extending longitudinally along the outermost bulge or projection of the door 7 and also extends along the front and rear side panels, 4 and 5, respectively, in a protective and/or decorative position, as the user may desire.

It is essential that molding 1 cushion and absorb impacts, shocks and the like, without deleterious effect, over a wide range of temperatures; that molding 1 resist cold and brittleness resulting therefrom deformation under heat and sunlight conditions; and, that the molding 1 withstand rain, snow and other precipitation and sunlight, day in and day out, all without adverse effect to its function as a protective device for the vehicle finish and as a decorative device to enhance the beauty and appearance of the vehicle.

Thus, molding 1 must retain its impact-absorbing characteristics under all weather conditions, over a wide range of temperatures and after prolonged and varied exposure to the elements, such as rain, snow and sunlight, and likewise must retain its shape, color and beauty following the same weathering conditions and exposure.

To this end the preferred form of molding 1 comprises a body portion 10, which is formed with an outer or exposed surface or surfaces 11 of any desired shape, so that a pleasing and decorative effect is or may be obtained, providing always that the thickness of the body portion is maintained sufficient to absorb the shocks and impacts, as described above, under the wide range of temperatures and weather conditions which are encountered during normal all-season use of the molding on vehicles.

As shown in FIG. 2, body 10 of the preferred form of molding 1 has a truncated outer surface or shape with a central longitudinal groove and for purposes of decoration is conveniently made so that the body is of one color and the groove is painted in a contrasting color. Body 10 also has an inner surface 12 which is shown flat in FIG. 2, but may be shaped and/or formed to conform with a particular line, design or configuration upon which the molding is to be mounted.

More important, in the preferred form of this invention the inner surface 12 of body 10 is coated or covered with a layer or cushion 14 of softer, vibration-absorbing material, such as polyurethane or the like.

Cushion 14 is disposed between the body member 10 of molding 1 and the vehicle, when the molding is mounted on the vehicle, and, being softer and more resilient and flexible than body member 10 and of cellular structure, functions to absorb vibrations occurring in the vehicle during the running and operation thereof, including those periods when the vehicle is at rest but the motor is running, so that the molding 1 is not detached from or jiggled off the vehicle due to vibrations in the surface upon which it is mounted.

Thus body 10 and cushion 14 cooperate, on the one hand, to protect and beautify the vehicle and, on the other hand, to maintain the molding on the vehicle and protect it against disengagement because of vibration in the vehicle, and more particularly, in the surface on which the molding is mounted. When the inner surface 12 of body 10 is shaped to complement a ridge or the like upon which the molding is to be mounted, the cushion 14 is, of course, similarly shaped.

In order to attach or mount the molding 1 on the vehicle, a coating of pressure sensitive adhesive 15 is applied to the exposed or inner surface 17 of cushion 14 and the adhesive 15 is, in turn, protected, during manufacture and handling, by a conventional backing strip 18, of paper or other convenient material. Backing strip 18, is, of course, removed from the molding 1 to expose the adhesive 15, when the molding is to be mounted or attached to the vehicle, leaving a molding comprising only the body 10, cushion 14 and adhesive 15.

The surface upon which molding 1 is mounted is, of course, preferably cleaned before the molding is applied thereto.

The user may, of course, apply a plurality of strips or sections of molding and may make the strips of various or indeterminative length, as he may desire, within the objects, precepts and purposes of this invention.

Further, as best seen in FIG. 3, in order to improve and increase the adherence between each molding strip, or section thereof and the vehicle surface upon which it is mounted and, in particular, to better adhere the ends of each molding strip to the vehicle surface and to improve resistance of the adhered molding against lifting of the ends and peeling off, the molding 1 is prestressed or deformed and curved or bowed inwardly, as at 20. Thus, when the molding is pushed against and mounted and adhered to the vehicle surface the prestress or deformation therein causes the ends of the molding to be stressed and urged into contact with and against the surface, improving adhesion and adherence in the manner and for the purpose noted above.

Viewed another way, the ends of the molding 1, when the molding is stressed and bowed as at 20, tend to conform to the shape of the vehicle surface, or at least to "dig in" to the surface, so that installation of the molding does not require distortion or stressing or bending of the ends of the molding inwardly, and thus there is no force resulting from any such distention or bending which tends to lift or separate the ends of the molding from the surface, which is often curved convexly, of the vehicle.

Further, the prestress and curve or bow 20 is preferably substantially uniform, as shown in FIG. 3, throughout the length of each section length or piece of molding 1 so that each part or portion of molding 1 cut from each length of molding, as manufactured, is similarly prestressed and deformed and curved or bowed as is each part or portion cut from each said part or portion.

For maximum effectiveness in resisting release or disengagement because of vibration the cushion 14 is at least one thirty-seconds inch thick and is preferably about one-sixteenth inch thick, the thickness depending in part upon the size and weight of the body portion 10, but being of a definite finite thickness more than a mere coating, as in the case of the adhesive 15, per se.

A typical molding 1, has a width of three-fourths inch, body height of one-fourth inch and a cushion of about one-sixteenth inch thickness, albeit a width of one-half inch is, also, frequently found desirable for increased aesthetic reasons. The molding 1, is, of course, cut to a length determined by the length of the vehicle surface, door or side panel, or the like, upon which it is to be applied.

Body member 10 is preferably made by extrusion, in a conventional manner, of a suitable plastic or other material of predetermined color.

Molding 1 is then made by adhering together an extruded and formed and painted or striped, if desired, body member 10 and a strip of cushion material of similar width, to which the adhesive 15 and backing 18 are already mounted, by means of a suitable pressure sensitive adhesive coated on the other (to be adhered) surface of the cushion 14. In order to improve adhesion between the cushion 14 and body member 10, the surface 12 of body member 10 is cleaned and treated, by means of a suitable solvent, just prior to contact and engagement with the adhesive-coated surface of cushion 14.

After molding 1 is thus formed, it is prestressed or deformed and curved or bowed by passing it through suitable apparatus, indicated generally at 25, FIG. 4.

Apparatus 25 comprises a pair of rollers 27 and 28, suitably mounted and driven by suitable means, such as pulley 30, belt 31 and motor 33 and provided with ingress and egress guides or guide means 35 and 36, respectively, set at a suitable predetermined angle, less than 180° to ensure that molding 1 is stressed and curved as and to the purposes described above. In the preferred form of apparatus for use with molding of the sizes described above, the rollers 27 and 28, which are driven at the same speed, as shown, are preferably 2 inches in diameter and the guides 35 and 36 are at an angle of about 120° with each other with guide 35 at an angle of about 30° with the horizontal.

A modified form of molding, indicated generally at 40 is shown in FIG. 5 and comprises a body portion 10', which is shown as being of rectangular configuration, a coating of pressure sensitive adhesive 42 and a backing strip 18, but no cushion 14 or prestress, deformation, or bow 20.

As noted above the body member 10 is preferably formed by extrusion from a suitable plastic in a conventional manner. It (and the molding) is adapted to function and obtain the objects of this invention over a temperature range of from 40° F. below 0° to at least 180° F. and preferably to over 200° F. and Cycolac ABS resins sold by the Marbon Chemical Division of Borg-Warner Corporation have been found suitable for the body member in order to obtain the objects and advantages of this invention.

Further, as shown in FIG. 6, in those instances where the contrasting color of the edge of the cushion 14 is found undesirable, by the user, from an aesthetic or decorative point of view, body member 10 can be formed with thin flaps or extensions 45 which, on the one hand, hide and conceal the edges of the cushion 14 and, on the other hand, are thin and flexible enough so as not to interfere with the mounting of the molding on the motor vehicle surface and its adhesion thereto or with the function and operation of the cushion 14 in absorbing vibration of the motor vehicle.

The flaps 45 are conveniently and preferably made of the same color as the surface 11 of the body member 10 so that the edge of the cushion is covered by the same color and has a compatible decorative effect with the surface 11.

Modifications, changes and improvements to the preferred and modified forms of the invention herein disclosed, described and illustrated may occur to those skilled in the art who come to understand the principles and precepts thereof. Accordingly, the scope of the patent to be issued hereon should not be limited to the particular embodiments of the invention set forth herein, but rather should be limited by the advance by which the invention has promoted the art.

I claim:

1. A protective and decorative accessory molding for direct adhesion to and mounting on vehicle doors, side panels and other surfaces comprising a protective and decorative elongated, flexible and resilient body member having an outer surface of predetermined configuration and color to provide a decorative appearance and an inner surface, a pressure sensitive adhesive on said inner surface for adhering and substantially permanently securing said molding to the surface to be decorated and protected, and a flexible covering detachably adhered to said pressure sensitive adhesive, said body member being weather resistant and resilient and shock resistant over a wide range of temperature and weather conditions, and said body member being prestressed and bowed longitudinally, substantially uniformly throughout the length of said body member and with the concave curvature on said inner surface, whereby said body member may be cut and divided at any predetermined place or places intermediate its length and each part and portion so cut and severed may be similarly cut and divided and all such cut and severed parts and portions including a body member which is prestressed, curved, flexible and resilient and has an outer surface of the same configuration and color as said body member and outer surface respectively, of the entirety from which it was cut and severed.

2. In combination a motor vehicle having door and side panels and a protective and decorative molding mounted thereon, said molding comprising a protective and decorative, longitudinally extending, flexible and resilient body member having an exposed surface of predetermined configuration and color to decorate said vehicle, an inner surface, and a pressure sensitive adhesive on said inner surface and adhering and substantially permanently securing said molding to said door and side panels, said molding extending for at least a portion of the length of said door and said side panels and being disposed to protect the outermost portions of said door and said side panels, and said body member being weather resistant and resilient and shock resistant over a wide range of temperature and weather conditions, said body member being prestressed and bowed inwardly longitudinally with said inner surface having a different and greater curvature longitudinally before mounting than that of the portion of the door and side panels upon which said molding is mounted.